United States Patent
Peroutky et al.

[11] 3,841,747
[45] Oct. 15, 1974

[54] APPARATUS INCLUDING RANDOM ACCESS POSITIONING MEANS

[75] Inventors: Donald C. Peroutky; Charles R. Stein, both of Schenectady, N.Y.

[73] Assignee: General Electric Company, Schenectady, N.Y.

[22] Filed: July 9, 1973

[21] Appl. No.: 377,418

[52] U.S. Cl. .................................................. 353/27
[51] Int. Cl. ............................................... G03b 23/08
[58] Field of Search ............................... 353/25–27

[56] References Cited
UNITED STATES PATENTS

| | | | |
|---|---|---|---|
| 3,330,191 | 7/1967 | King | 353/27 |
| 3,700,320 | 10/1972 | Brewer | 353/26 |
| 3,730,619 | 5/1973 | Fuijimoto | 353/26 |
| 3,744,891 | 7/1973 | Dennis | 353/27 |

*Primary Examiner*—William D. Martin, Jr.
*Assistant Examiner*—A. Jason Mirabito
*Attorney, Agent, or Firm*—David M. Schiller; John F. Ahern; Paul F. Wille

[57] ABSTRACT

Apparatus including random access positioning means, such as a film projector for use with a microfiche film card having a plurality of frames within an X and Y coordinate system and identified by corresponding addresses along the respective X and Y axes. Means are arranged to provide frame preselection signals representative of the address of a preselected frame to be positioned at a frame projection window. Means including a single electric motor and a pair of springs are provided for automatically moving the film card relative to the projection window in the directions of the X and Y axes initially to a zero reference reset position at which frame number "1" of the film card is positioned at the projection window and thereafter to one of a plurality of positions predetermined by the address of the preselected frame. Provision is made to generate and count control signals in response to movement of the film card away from the reset position to provide continuous representations of the addresses of those frames arriving at the projection window. Means are provided to compare the control signals and the frame preselection signals and for automatically terminating movement of the film card in response to occurrence of coincidence between the frame preselection signals and the control signals to thereby position the preselected frame at the projection window.

18 Claims, 4 Drawing Figures

APPARATUS INCLUDING RANDOM ACCESS POSITIONING MEANS

BACKGROUND OF THE INVENTION

This invention relates generally to means for providing random access to any one of a plurality of areas of an object, and particularly to a film projector wherein random access is provided to any one of a plurality of frames of a film card.

Random access film projectors of prior design have included a pair of X and Y electric motors and associated complex mechanism for moving the film card in the directions of X and Y axes to position a preselected frame of a film card at the projection window. Such prior art projectors include means for effecting movement of the film card from a previous position directly to a new position wherein a preselected frame is positioned at the projection window. The provision in prior art film projectors of two electric motors and associated complex mechanism for moving the film card contributes to the high cost and bulky structure of such prior art devices. Also, the arrangement wherein the film card is moved directly from a prior position to the newly selected position can possibly result in inaccurate positioning of the frame at a position different from the intended new position because of the build up of errors in the system.

OBJECTS OF THE INVENTION

It is, therefore, an object of the invention to provide improved apparatus wherein random access to any one of a plurality of areas of an object is quickly and automatically provided in a comparatively simple and inexpensive manner.

It is another object of the invention to provide improved apparatus of such character wherein the possibility of inaccurate positioning of a preselected area is minimized.

It is a further object of the invention to provide an improved automatic random access film projector with comparatively simple and inexpensive means for rapidly and accurately positioning a preselected film frame at a projection window.

Other objects and advantages of the invention will be apparent from the following description taken in conjunction with the accompanying drawings.

SUMMARY OF THE INVENTION

In carrying out the invention in one preferred form, apparatus is provided for use with an object having a plurality of areas within an X and Y coordinate system and identified by corresponding addresses along the respective axes. Means are arranged to provide area preselection signals which are representative of the address of a preselected one of said areas, and positioning means are provided effective when actuated for moving the object relative to a work station in the directions of said axes to any one of a plurality of positions in each of which a separate one of said areas is positioned at the work station. The apparatus includes drive means effective when operated to actuate the positioning means for moving the object away from one of the positions initially to a zero reference reset position at which the number 1 area of the object is positioned at the work station and thereafter to another position predetermined by the address of the preselected area. Provision is made to generate and count control signals in response to movement of the object away from the reset position to provide a continuous representation of address of areas arriving at the work station. Means are provided to compare the area preselection signals and the control signals and for automatically terminating movement of the object in response to occurrence of coincidence between the area preselection signals and the control signals to thereby position the preselected area at the work station.

In the preferred embodiment of the invention, the positioning means includes a pinion mounted with its axis extending in the direction of one of the X and Y axes for rotation about its axis, and a gear rack connected to the object and mounted with its axis extending in the direction of the other of the X and Y axes in meshing engagement with the pinion and for sliding movement axially of the pinion. The drive means include a single electric motor and a pair of springs with coupling means for releasable engagement with the motor and connected to the springs to couple the motor and the springs to the pinion and to the gear rack. Suitable frame change means is provided to generate a signal for energizing the motor and for engaging the motor and the coupling means. Limit switches are positioned for actuation in response to arrival of the object at the reference reset position for disengaging the motor and the coupling means to thereby render the springs effective to rotate the pinion and slide the gear rack for moving the object away from the reset position towards a position wherein the preselected area is positioned at the work station. Operation of the positioning means is terminated in response to coincidence detection between the control signals and the area preselection signals to thereby position the preselected area at the work station.

DESCRIPTION OF A PREFERRED EMBODIMENT

Figure 1:
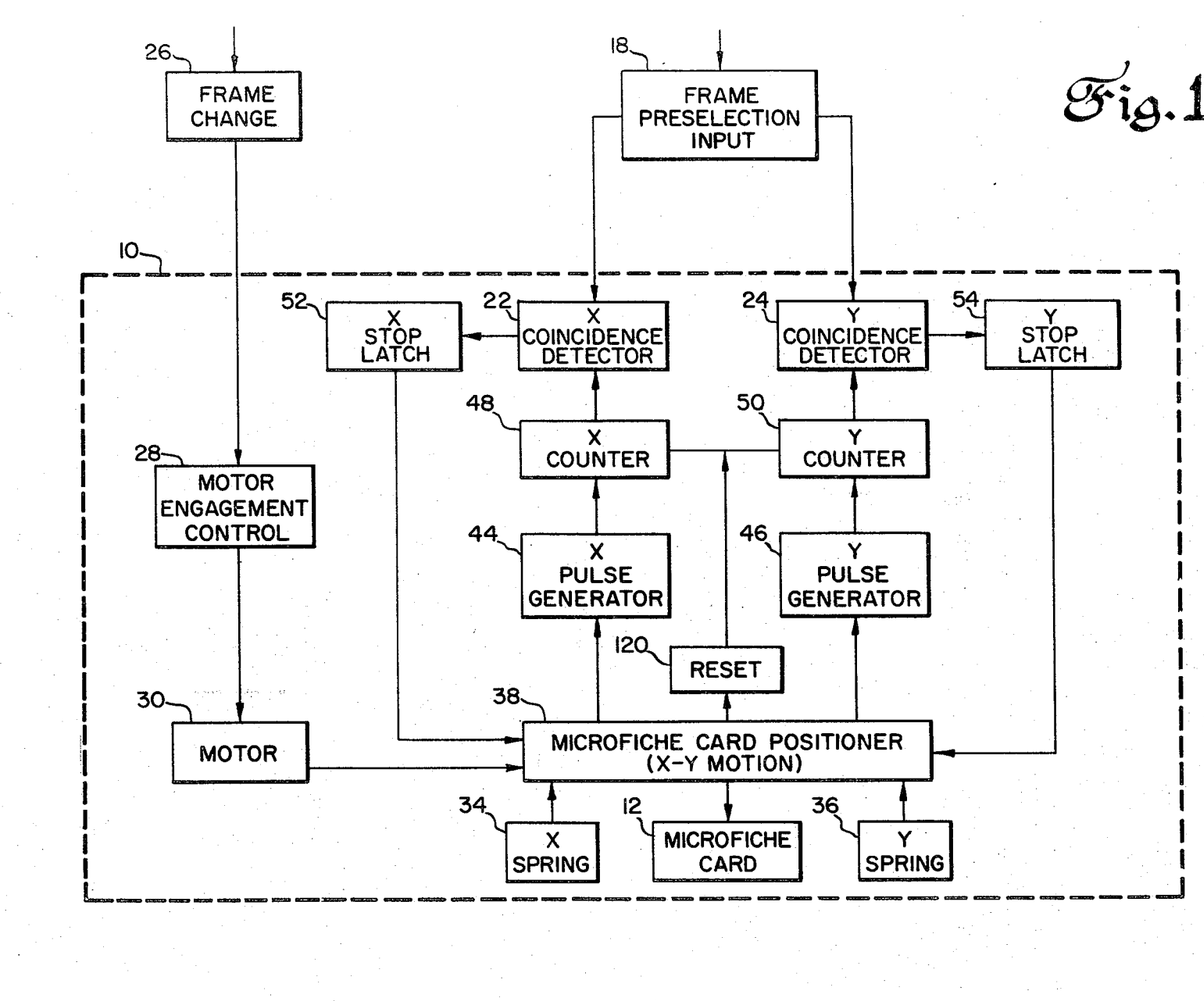
FIG. 1 is a block diagram showing in block form the various circuits and mechanisms employed in the preferred embodiment of the invention.
Figure 2:
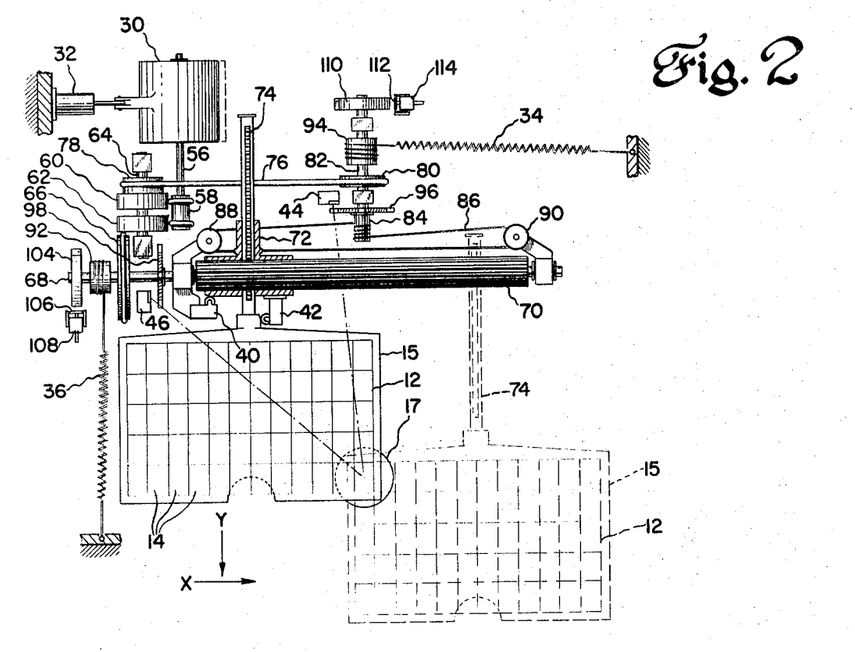
FIG. 2 is a schematic view in top plan showing the positioning and driving mechanisms for moving the film card.

Referring now to the drawings, there is illustrated in FIG. 1 a block diagram showing in block form the various circuits and mechanisms employed in the random access apparatus which is represented generally by the broken line rectangle 10. The present invention is applicable to a variety of devices for use with any suitable object which it is desired to position at various preselected locations relative to a work station, such as an X and Y coordinate plotter, machine tool, printer, etc. However, the invention will be described in connection with a random access microfiche projector for use with a movable microfiche film card 12 having a plurality of frames 14 (FIG. 2) located within an X and Y coordinate system. The card 12 is mounted between a pair of transparent sheets carried by a tray 15 resting on a flat surface 16 for movement in a plane along horizontal and vertical X and Y axes as illustrated in FIG. 2.

In the embodiment of the invention illustrated, the card 12 contains 60 frames arranged in five rows and 12 columns although it is understood that a greater or lesser number of frames may be employed. For example, a film card having 98 frames arranged in seven rows and fourteen columns may be utilized. Each frame 14 has an identifiable coordinate position which is identified by corresponding addresses along the respective X and Y axes. For example, the first frame 14 located at the lower right hand corner of the card 12 as viewed in FIG. 2 may be addressed as 1,1 (X=1, Y=1) and the last frame 14 located at the upper left hand corner of the card 12 may be addressed as 12,5 (X=12, Y=5). Alternatively, a frame 14 may be addressed by a frame number from 1 to 60 instead of by X and Y coordinate positions.

In order to preselect a particular frame 14 for positioning at a projection window 17 (FIG. 2), a suitable conventional frame preselection input means 18 which is preferably located external to the apparatus 10 is provided to produce X and Y signals in binary form representative respectively of the row and column number of the preselected frame. If it is preferred to address the frames by frame numbers from 1 to 60 instead of by X and Y coordinate positions, then the means 18 would include a suitable converter so that input to the apparatus 10 is in binary form describing the X and Y coordinate positions of the preselected frame. Decimal to binary converters and decimal to X and Y coordinate converters suitable for use in the means 18 are well known in the art. The X and Y binary signals produced by the means 18 are applied to the apparatus 10 which includes means to provide such signals respectively to X and Y coincidence detector circuits 22 and 24 each of which may include exclusive OR gates.

In order to initiate movement of the tray 15 and card 12 relative to the projection window 17 to position the preselected frame 14 at the window, a suitable frame change means 26 is provided to generate a signal for actuating the drive means. The "initiate" signal may be generated in any suitable manner either coincidentally with or subsequent to generation of the frame preselection signals, and energizes a motor engagement control 28 for effecting simultaneous energization of a motor 30 and motor actuating means such as a solenoid 32 (FIG. 2) which moves the motor 30 into engagement with coupling means which operatively connects the motor 30 and also a pair of X and Y springs 34 and 36 to the card positioning mechanism 38. The positioning mechanism 38 is arranged to move the tray 15 relative to the projection window in a plane in the directions of the X and Y axes to any one of a plurality of positions in each of which a separate one of the frames 14 is positioned at the projection window.

In accord with the invention, the drive means is effective when operated to actuate the positioning means 38 for initially moving the tray 15 away from its previous position to a zero reference reset position and for automatically thereafter moving the tray 15 towards another position which is predetermined by the frame preselection signals representative of the address of the preselected frame 14. In the embodiment shown, the zero reference reset position of the tray 15 positions frame number 1, which is at the lower right hand corner of the card 12, at the projection window. Means including normally closed X and Y limit switches 40 and 42 (FIG. 2) are disposed for actuation to open positions in response to arrival of the tray 15 at the reset position to effect deenergization of the motor 30 and also disengagement of the motor 30 and the coupling means whereupon the springs 34 and 36 acting in the directions of the X and Y axes are effective to actuate the positioning mechanism 38 through the coupling means for moving the tray 15 away from the reset position towards a position predetermined by the address of the preselected frame 14.

The present invention provides means for generating and counting control signals in response to movement of the tray 15 away from the reset position under the action of the springs 34 and 36 to continuously identify the addresses of those frames arriving at the projection window. To this end, a pair of X and Y pulse generators 44 and 46 are arranged so that each generates a certain number of pulses for one frame space movement of the card 12, and these pulses are applied respectively to a pair of X and Y counting circuits 48 and 50 which count the applied generated pulses and produce output signals which are representative respectively of the row and column identification of frames arriving at the projection window. These output signals are in binary form and are applied to the detection circuits 22 and 24. Control means are provided for automatically terminating movement of the tray 15 upon its arrival at the position predetermined by the address of the preselected frame in response to occurrence of coincidence between the frame preselection signals produced by the frame preselection input means 18 and the control signals produced by the counters 48 and 50 as detected by the coincidence detector circuits 22 and 24. The control means includes X and Y stop latch mechanisms 52 and 54 which are operable in response to occurrence of coincidence detection by the associated detector circuits 22 and 24 to latch the positioning means 38 for terminating movement of the tray 15.

Referring now to FIG. 2 details of the drive means, coupling means and positioning means will be described. The drive means includes the motor 30 which has a shaft 56 to which is attached a drive drum 58 for releasable engagement with a pair of idler drums 60 and 62 independently rotatable on a shaft 64 extending in the direction of the Y axis. The motor 30 is actuatable between an operating position wherein the drum 58 drivingly engages the idler drums 60 and 62 and a normal inoperable position wherein the drum 58 is spaced from the idler drums 60 and 62 in response to energization and deenergization respectively of the solenoid 32.

The Y axis drive includes a friction wheel 66 fixed on a shaft 68 mounted for rotation about an axis extending in the direction of the X axis such that the friction wheel 66 engages a side of the idler drum 62 for rotation in accord with rotation of the drum 62. A pinion 70 is fixed on shaft 68 for rotation therewith and extends loosely through a first passage of a T-shaped member 72 which is freely slidable along the length of the pinion 70. The T-shaped member 72 includes a second passage at right angles to and in communication with the first passage for slidably receiving a gear rack 74 in meshing engagement with the pinion 70. The gear rack 74 has one end attached in any suitable manner to the upper side of the tray 15 as viewed in FIG. 2 such that movements of the gear rack 74 in directions of the X and Y axes effect corresponding movements of the tray 15 and the card 12 mounted thereby.

The X axis drive includes a belt 76 extending around a section 78 of the idler drum 60 and around a pulley 80 fixed on a shaft 82 mounted for rotation about an axis spaced from and parallel to the shaft 64 which carries the idler drums 60 and 62. A second pulley 84 is fixed on the shaft 82 and has wound thereabout several turns of a flexible cord 86 which may be attached to the pulley 84 and which extends about a pair of spaced wheels 88 and 90. The cord 86 includes two spaced ends which are suitable connected to the T-shaped member 72.

In the preferred embodiment of the invention, the positioning means 38 is proportioned such that the tray 15 is moved along each of the X and Y axes by an amount equal to one frame space for each one-half revolution of the pinion 70 and the pulley 84. To this end, the diameter of the pulley 84 is selected to effect one frame space movement of the tray 15 along the X axis for each one-half revolution of the pulley 84, and the pitch diameter of the pinion 70 is chosen to effect one frame space movement of the tray 15 along the Y axis for each one-half revoluiton of the pinion 70. In a sixty frame card having Y axis frame spacing of 0.650 inch, a pinion 70 with 48 pitch and 20 teeth having a pitch diameter of 0.417 inch is selected. With X axis frame spacing of 0.463 inches and with a 0.04 inch diameter cord 86, the diameter of the pulley is selected to be 0.255 inch. It is understood that the positioning means 38 may be proportioned such that the tray 15 is moved by an amount equal to one frame space for each complete revolution of the pinion 70 and pulley 84, or some integral fraction of a revolution other than one-half, as desired.

As previously mentioned, springs 34 and 36 are connected to the coupling means for operation respectively in directions of the X and Y axes to actuate the positioning means 38 when the motor 30 is disengaged from the coupling means in response to arrival of the tray 15 at its reset position. For this purpose, the Y axis spring 36 has one end thereof fixed and its other end connected to a drum 92 fixed on the shaft 68 for winding and unwinding relative to the drum 92 in response to rotation of the shaft 68. In a similar manner, the X axis spring 34 has one end thereof fixed and its other end connected to a drum 94 fixed on the shaft 82 for winding and unwinding relative to the drum 94 in response to rotation of the shaft 82. The springs 34 and 36 are preferably coil springs and are selected to have substantially the same spring forces.

A pair of X and Y shutters 96 and 98 are mounted in the path of light from a lamp 99 (FIG. 3) for rotation in accord with movements of the tray 15 from its reset position along the X and Y axes. To this end, the X shutter 96 comprises a circular member fixed on the shaft 82 and the Y shutter 98 similarly comprises a circular member fixed on the shaft 68 for periodically permitting exposure of light-responsive pulse generators 44 and 46 to light suitably directed from the lamp 99. The generators 44 and 46 comprise conventional photo-transistors for producing output pulses each time the photo-transistors are exposed to light. In the preferred embodiment, each of the shutters 96 and 98 has two diametrically opposed apertures such that two pulses are generated by each of the generators 44 and 46 for each full revolution of the associated pulley 84 and pinion 70. Therefore, one pulse is produced by each of the pulse generators 44 and 46 for movement of the card 12 one fame space along each of the X and Y axes. The arrangement is such that a pulse is generated at a time just prior to arrival of a frame 14 at the projection window and the generated pulses are counted by the counters 48 and 50 which may comprise conventional integrated circuit counters. The binary outputs of the counters 48 and 50 are applied to the coincidence detector circuits 22 and 24 each of which is designed to produce a zero voltage output so long as the binary inputs thereto from the associated counters 48 and 50 and from the frame preselection input means 18 lack coincidence, and to produce a certain finite voltage output in response to the occurrence of coincidence between the binary inputs thereto from the counters 48 and 50 and from the input means 18.

The Y stop latch mechanism 54 includes a ratchet wheel 104 on the shaft 68 which has two diametrically opposed teeth each for engagement with a pawl 106 which is actuated by a solenoid 108. Similarly, the X latch mechanism 52 includes a ratchet wheel 110 on the shaft 82 having two diametrically opposed teeth each for engagement with pawl 112 actuated by solenoid 114. The pawls 106 and 112 may comprise extended armatures of the solenoids 108 and 114 which are preferably small clapper type electromechanical relays. The solenoids 108 and 114 are connected for energization in response to generation of the "initiate" signal and for deenergization in response to certain finite voltages appearing at the outputs of the coincidence detection circuits 22 and 24. When the solenoids 108 and 114 are energized, the associated pawls 106 and 112 are retracted out of engagement with the ratchet wheels 104 and 110 and when the solenoids 108 and 114 are deenergized, the pawls 106 and 112 spring into engagement with the ratchet wheels 104 and 110 to engage teeth thereof for stopping rotation of the shafts 68 and 82. The solenoids 108 and 114 also control energization of the solenoid 116 to control the position of a shutter 118 relative to the projection light path. For this purpose, the solenoids 108 and 114 include contacts connected in a control circuit including the solenoid 116 such that the shutter 118 is located in the light path to blank the projected picture during frame changing when the solenoids 108 and 114 are energized, and is located out of the path of light when the solenoids 108 and 114 are deenergized.

Figure 4:
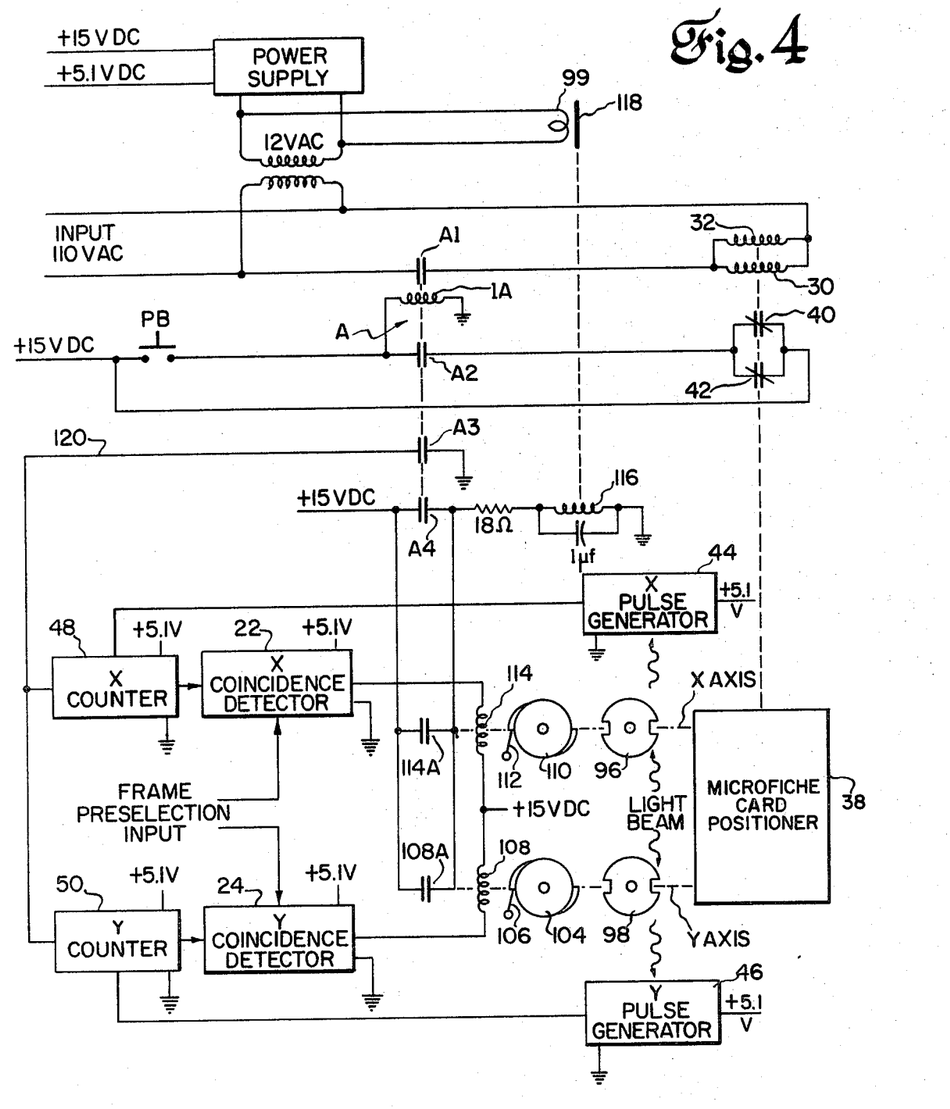
FIG. 4 is a schematic circuit diagram illustrating the control circuits employed in the apparatus.

Referring now to the schematic circuit diagram of FIG. 4, there is shown suitable A.C. and D.C. power supply means to supply electric power to the lamp 99 and also to provide proper voltage levels to the various logic and control circuits. A control relay A is provided including a winding 1A and a plurality of normally open contacts A1, A2, A3 and A4 which are in open conditions when the winding 1A is deenergized and which are actuated closed when the winding 1A is energized. The contacts A1 are included in an energizing circuit for the motor 30 and for the solenoid 32 which are parallel connected. The contacts A2 are included in a holding circuit for the winding 1A which also includes the parallel connected limit switches 40 and 42. The contacts A3 are included in a reset circuit 120 for the counters 48 and 50, and the contacts A4 are included in an energizing circuit for the solenoid 116.

In the illustrated embodiment of the invention, energization of the winding 1A of the control relay A is controlled by a manually operated normally open pushbutton PB which may be of the momentary close, spring return type. While a pushbutton PB is shown, it is understood that other means may be utilized to provide the "initiate" signal.

Also, the solenoids 108 and 114 include respectively normally open contacts 108A and 114A connected in energizing circuits for the solenoid 116. These contacts are open when the solenoids 108 and 114 are deenergized and are actuated closed when the solenoids 108 and 114 are energized.

Normally, all active components of the apparatus are deenergized when a particular frame is being projected for viewing, with the exception of the projection lamp 99. This permits minimum heat dissipation and quiet operation. Assume now that the operator preselects for viewing a specific card frame by means of a keyboard or similar device. The input means 18 converts this preselection into binary signals representative of the row and column numbers of the preselected frame and these binary signals are applied to the apparatus 10 for provision to the detector circuits 22 and 24. The "initiate" signal is applied either simultaneously with or subsequent to application of the frame preselection signals and in the illustrated embodiment, such signal is applied by closing the pushbutton PB which effects energization of the coil 1A of relay A to close contacts A1, A2, A3 and A4. Closure of contacts A1 effects energization of the motor 30 and the solenoid 32 which moves the drum 58 into engagement with the idler drums 60 and 62. Closure of contacts A2 establishes a holding circuit for the winding 1A which maintains energization of the winding 1A subsequent to opening of the pushbutton PB. Closure of contacts A3 connects the counters 48 and 50 to ground to reset the counters, and closure of contacts A4 effects energization of solenoid 116 to move the shutter 118 to its picture blanking position. Also at this time, the solenoids 108 and 114 are energized to retract the pawls 106 and 112 out of engagement with teeth on the ratchet wheels 104 and 110 and to close contacts 108A and 114A.

Energization of the motor 30 causes its shaft to rotate in a direction to rotate the drums 60 and 62 and the friction wheel 66 in directions for rotating the pinion 70 in a counter-clockwise direction as viewed from the right hand end of the pinion in FIG. 2. Such rotation of the pinion 70 effects movement of the gear rack 74 and the tray 15 upwardly as viewed in FIG. 2. Simultaneously, the belt 76 and the shaft 82 are rotated in directions to effect sliding movement of the gear rack 74 and the tray 15 relative to the pinion 70 towards the left as viewed in FIG. 2. The tray 15 is thereby moved upwardly and to the left as viewed in FIG. 2 towards the reset position wherein frame number 1 will be positioned at the projection window. During movement of the tray 15 towards the reset position, the springs 34 and 36 are being wound on the drums 92 and 94 which operate to expand the springs.

When the tray 15 arrives at the reset position in which the tray is shown in full lines in FIG. 2, the limit switches 40 and 42 are actuated from their normally closed positions to open positions. To this end, the X limit switch 40 is mounted in a position for engagement with a cam follower surface on the T-shaped member 72 when the tray is moved to a position along the X axis corresponding to the X axis reset position, and the Y limit switch 42 is carried by the T-shaped member 72 in a position for engagement with a cam follower surface on the tray when the tray is moved to a position along the Y axis corresponding to the Y axis reset position. It is quite possible that the tray 15 will arrive at the reset position along one axis in advance of its arrival at the reset position along the other axis. In such event, one of the limit switches will be actuated in advance of actuation of the other limit switch. However, this will be ineffective to deenergize the motor 30 and the solenoid 32 inasmuch as the limit switches 40 and 42 are connected in parallel circuit relation and must both be actuated to open positions before the holding circuit for the winding 1A is opened and deenergization of the motor 30 and the solenoid 32 occurs. If the tray arrives at its reset position along one axis prior to its arrival at the reset position along the other axis, the drive means along the first axis will merely slip while the drive means along the other axis continues to move the tray along such axis.

Upon arrival of the tray 15 at the reset position, both limit switches 40 and 42 are actuated to open positions whereby the winding 1A is deenergized and the contacts A1, A2, A3 and A4 are opened. Opening of contacts A1 effects deenergization of the motor 30 and the solenoid 32 to move the motor 30 out of engagement with the idler drums 60 and 62 thereby disconnecting the motor 30 from the positioning mechanism. Opening of the contacts A2 prevents reenergization of the winding 1A in response to reclosure of the limit switches 40 and 42 as the tray 15 moves away from its reset position. Opening of contacts A3 conditions the counters 48 and 50 for their counting function, and opening of contacts A4 results in continued energization of the solenoid 116 through the parallel connected and now closed contacts 114A and 108A.

At this time, the springs 34 and 36 are free to contract from their expanded conditions and in so doing the springs 34 and 36 effect rotation of shafts 68 and 82 in directions opposite to their directions of rotation resulting from rotation of the motor shaft 56. This causes rotation of the pinion 70 in the clockwise direction as viewed from the right hand end of the pinion as viewed in FIG. 2, and sliding movement of the gear rack 74 relative to the pinion towards the right as viewed in FIG. 2. The tray 15 is thereby moved away from the reset position downwardly and towards the right as viewed in FIG. 2 towards a position predetermined by the address of the preselected frame. As the tray 15 moves in such direction, the limit switches 40 and 42 are actuated to their normally closed conditions but this is ineffective to reenergize the winding 1A because the contacts A2 are now open.

During such movement of the tray 15 the shutters 96 and 98 rotate to gate light to the pulse generators 44 and 46 which each produces one pulse for each frame space movement of the tray 15 along the X and Y axes. These pulses are counted by the counters 48 and 50 and the counter output signals in binary form are applied to the respective coincidence detectors 22 and 24. When the detectors 22 and 24 detect coincidence between the frame preselection signals and the signals from the counters 48 and 50, certain finite voltages appear at the outputs of the detectors 22 and 24 resulting in deenergization of solenoids 108 and 114 and release of the pawls 106 and 112 which spring into engagement with teeth on the ratchet wheels 104 and 110 to stop rotation of the shafts 68 and 82. In the event that the tray 15 arrives at the preselected position along one axis in advance of its arrival at the preselected position along the other axis, the coincidence detector associated with the one axis will detect coincidence and the associated one of the solenoids 108 and 114 will be de-energized to stop operation of the drive means along such one axis. Also, the associated one of the contacts 108A and 114A will open but this is ineffective to de-energize the solenoid 116 since the other contact is still closed. By such means the preselected frame is positioned at the projection window for viewing.

Figure 3:
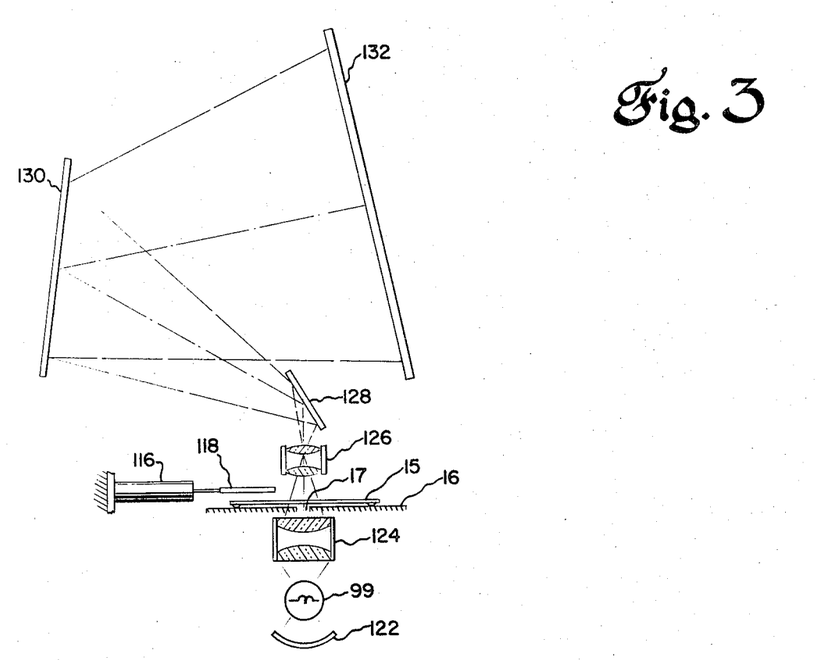
FIG. 3 is a schematic view in side elevation showing the optical system of the projector apparatus.

As shown in FIG. 3, the projector apparatus includes a curved reflector 122 beneath the lamp 99 and a condenser lens 124 above the lamp 99 and beneath the surface 16. A projection lens 126 is positioned above the tray 15 and an angularly disposed mirror 128 is located above the projection lens 126 to reflect light rearwardly to a larger mirror 130 which in turn reflects light forwardly to a viewing screen 132 whereby an image of a frame 14 at the projection window appears at the screen 132.

While the invention has been described in connection with a random access film projector, other applications of the invention are possible. For example, the apparatus may comprise a machine tool for performing machining operations on a metal object which would replace the film card for random access movement relative to a work station.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. Apparatus for use with an object having a plurality of areas within a two-dimensional coordinate system and identified by corresponding addresses along the respective dimensions comprising:
    a. means for providing area preselection signals representative of the address of a preselected one of said areas,
    b. a fixed work station,
    c. positioning means effective when actuated for moving said object relative to said work station in the directions of said dimensions to any one of a plurality of positions in each of which a separate one of said areas is positioned at said work station,
    d. drive means effective each time when operated to actuate said positioning means for initially moving said object away from one of said positions to a reference reset position and for automatically thereafter moving said object away from said reference reset position towards another of said positions which is predetermined by the address of said preselected area,
    e. said drive means including
        i. an electric motor,
        ii. coupling means for releasable engagement with said motor for coupling said motor to said positioning means, said coupling means being operable when in engagement with said motor to actuate said positioning means to move said object to said reference reset position,
        iii. limit switch means positioned for actuation in response to arrival of said object at said reference reset position to effect disengagement of said motor and said coupling means, and
        iv. spring means connected to said coupling means and effective in response to disengagement of said motor and said coupling means to actuate said positioning means to move said object away from said reference reset position,
    f. means for initiating operation of said drive means,
    g. means for generating and counting control signals in response to movement of said object away from said reference reset position to continuously identify the addresses of those areas arriving at said work station, and
    h. control means for comparing said area preselection signals and said control signals and for automatically terminating movement of said object upon its arrival at said another position in response to occurrence of coincidence between said area preselection signals and said control signals to thereby position said preselected area at said work station.

2. Apparatus as defined in claim 1 wherein said positioning means includes
    a. a pinion mounted with its axis extending in the direction of one of said dimensions for rotation about its axis, and
    b. a gear rack connected to said object and mounted with its axis extending in the direction of the other of said dimensions in meshing engagement with said pinion and for sliding movement axially of said pinion.

3. Apparatus as defined in claim 1 wherein said means for generating and counting control signals includes
    a. a light source,
    b. a pair of shutters each mounted in the path of light from said light source for rotation in accord with movement of said object in the separate directions of said dimensions,
    c. a pair of pulse generators each responsive to light gated by a separate one of said shutters for generating said control signals, and
    d. a pair of counting circuits each for counting the control signals generated by a separate one of said generators.

4. Apparatus as defined in claim 1 wherein said control means includes
    a. a pair of coincidence detector circuits, and
    b. a pair of pawl and ratchet mechanisms each responsive to coincidence detection by a separate one of said coincidence detector circuits for terminating operation of said drive means.

5. Apparatus as defined in claim 1 wherein the number 1 area of said object is positioned at said work station when said object is positioned in its reference reset position.

6. Apparatus for use with an object having a plurality of areas within a two-dimensional coorinate system and identified by corresponding addresses along the respective dimensions comprising:
    a. means for providing area preselection signals representative of the address of a preselected one of said areas,
    b. a fixed work station, c. positioning means effective when actuated for moving said object relative to said work station in the directions of said dimensions to any one of a plurality of positions in each of which a separate one of said areas is positioned at said work station, d. said positioning means including
  i. a pinion mounted with its axis extending in the direction of one of said dimensions for rotation about its axis, and
  ii. a gear rack connected to said object and mounted with its axis extending in the direction of the other of said dimensions in meshing engagement with said pinion and for sliding movement axially of said pinion, e. drive means effective each time when operated to actuate said positioning means for initially moving said object away from one of said positions to a reference reset position in which the number 1 area of said object is positioned at said work station and for automatically thereafter moving said object away from said reference reset position towards another of said positions which is predetermined by the address of said preselected area, f. said drive means including
  i. an electric motor,
  ii. coupling means for releasable engagement with said motor and operable when in engagement with said motor to rotate said pinion about its axis and to slide said gear rack axially of said pinion in directions to move said object to said reference reset position,
  iii. limit switch means positioned for actuation in response to arrival of said object at said reference reset position to effect disengagement of said motor and said coupling means, and
  iv. a pair of springs connected to said coupling means and effective in response to disengagement of said motor and said coupling means to rotate said pinion about its axis and to slide said gear rack axially of said pinion in directions to move said object away from said reference reset position, g. means for initiating operation of said drive means, h. means for generating and counting control signals in response to movement of said object away from said reference reset position to continuously identify the addresses of those areas arriving at said work station, and i. control means for comparing said area preselection signals and said control signals and for automatically terminating movement of said object upon its arrival at said another position in response to occurrence of coincidence between said area preselection signals and said control signals to thereby position said preselected area at said work station.

7. Apparatus as defined in claim 6 wherein said means for generating and counting control signals includes
  a. a light source,
  b. a first shutter mounted in the path of light from said light source for rotation about an axis parallel to the axis of said gear rack,
  c. a second shutter mounted in the path of light from said light source for rotation about the axis of said pinion,
  d. a pair of pulse generators each responsive to light gated by a separate one of said first and second shutters for generating said control signals, and
  e. a pair of counting circuits each for counting the control signals generated by a separate one of said generators.

8. Apparatus as defined in claim 6 wherein said control means includes
  a. a pair of coincidence detector circuits, and
  b. a pair of pawl and ratchet mechanisms each responsive to coincidence detection by a separate one of said coincidence detector circuits for terminating operation of said drive means.

9. Apparatus as defined in claim 6 wherein said coupling means includes
  a. a pair of idler drums mounted for rotation about a common axis parallel to said other of said dimensions for driving engagement with said motor.
  b. a friction wheel fixed on the axis of said pinion in driving engagement with one of said idler drums,
  c. a shaft mounted for rotation about an axis spaced from and parallel to the common axis of rotation of said idler drums,
  d. a belt and pulley mechanism connecting the other of said idler drums and said shaft, and
  e. a cord and pulley mechanism connecting said shaft and said gear rack.

10. Film projector apparatus comprising:
  a. a movable support for supporting a film card having a plurality of frames within an X and Y coordinate system and identified by corresponding addresses along the respective X and Y axes,
  b. a frame projection window,
  c. a lamp positioned to illuminate said projection window,
  d. means for providing frame preselection signals representative of the address of a preselected one of said frames,
  e. positioning means effective when actuated for moving said support relative to said projection window in the directions of said X and Y axes to any one of a plurality of positions in each of which a separate one of said frames is positioned at said projection window,
  f. drive means effective each time when operated to actuate said positioning means for initially moving said support away from one of said positions to a reference reset position in which the number "1" frame of said film card is positioned at said projection window and for automatically thereafter moving said support away from said reference reset position towards another of said positions which is predetermined by the address of said preselected frame,
  g. said drive means including
    i. an electric motor,
    ii. coupling means for releasable engagement with said motor for coupling said motor to said positioning means, said coupling means being operable when in engagement with said motor to actuate said positioning means to move said support to said reference reset position,
    iii. limit switch means positioned for actuation in response to arrival of said support at said reference reset position to effect disengagement of said motor and said coupling means, and
  iv. spring means connected to said coupling means and effective in response to disengagement of said motor and said coupling means to actuate said positioning means to move said support away from said reference reset position,
h. means for initiating operation of said drive means,
i. means for generating and counting control signals in response to movement of said support away from said reset position to continuously identify the addresses of those frames arriving at said projection window, and
j. control means for comparing said frame preselection signals and said control signals and for automatically terminating movement of said support upon its arrival at said another position in response to occurrence of coincidence between said frame preselection signals and said control signals to thereby position said preselected frame at said projection window.

11. Apparatus as defined in claim 10 wherein said positioning means includes
  a. a pinion mounted with its axis extending in the direction of one of said X and Y axes for rotation about its axis, and
  b. a gear rack connected to said support and mounted with its axis extending in the direction of the other of said X and Y axes in meshing engagement with said pinion and for sliding movement axially of said pinion.

12. Apparatus as defined in claim 10 wherein said means for generating and counting control signals includes:
  a. a pair of shutters each mounted in the path of light from said lamp for rotation in accord with movement of said support along the separate X and Y axes,
  b. a pair of pulse generators each responsive to light gated by a separate one of said shutters for generating said control signals, and
  c. a pair of counting circuits each for counting the control signals generated by a separate one of said generators.

13. Apparatus as defined in claim 10 wherein said control means includes:
  a. a pair of coincidence detector circuits, and
  b. a pair of pawl and ratchet mechanisms each responsive to coincidence detection by a separate one of said coincidence detector circuits for terminating operation of said drive means.

14. Film projector apparatus comprising:
  a. a movable support for supporting a film card having a plurality of frames within an X and Y coordinate system and identified by corresponding addresses along the respective X and Y axes,
  b. a frame projection window,
  c. a lamp positioned to illuminate said projection window,
  d. means for providing frame preselection signals representative of the address of a preselected one of said frames,
  e. positioning means effective when actuated for moving said support relative to said projection window in the directions of said X and Y axes to any one of a plurality of positions in each of which a separate one of said frames is positioned at said projection window,
  f. said positioning means including
    i. a pinion mounted with its axis extending in the direction of said X axis for rotation about its axis, and
    ii. a gear rack connected to said support and mounted with its axis extending in the direction of said Y axis in meshing engagement with said pinion and for sliding movement axially of said pinion,
  g. drive means effective each time when operated to actuate said positioning means for initially moving said support away from one of said positions to a reference reset position in which the number 1 frame of said film card is positioned at said projection window and for automatically thereafter moving said support away from said reference reset position towards another of said positions which is predetermined by the address of said preselected frame,
  h. said drive means including
    i. an electric motor,
    ii. coupling means for releasable engagement with said motor and operable when in engagement with said motor to rotate said pinion about its axis and to slide said gear rack axially of said pinion in directions to move said support towards said reference reset position,
    iii. limit switch means positioned for actuation in response to arrival of said support at said reference reset position to effect disengagement of said motor and said coupling means, and
    iv. a pair of springs connected to said coupling means and effective in response to disengagement of said motor and said coupling means to rotate said pinion about its axis and to slide said gear rack axially of said pinion in directions to move said support away from said reference reset position,
  i. means for effecting engagement between said motor and said coupling means and initiating operation of said drive means,
  j. means for generating and counting control signals in response to movement of said support away from said reference reset position to continuously identify the addresses of those frames arriving at said projection window, and
  k. control means for comparing said frame preselection signals and said control signals and for automatically terminating movement of said support upon its arrival at said another position in response to occurrence of coincidence between said frame preselection signals and said control signals to thereby position said preselected frame at said projection window.

15. Apparatus as defined in claim 14 wherein said means for generating and counting control signals includes
  a. a first shutter mounted in the path of light from said lamp for rotation about an axis parallel to said Y axis,
  b. a second shutter mounted in the path of light from said lamp for rotation about the axis of said pinion, c. a pair of pulse generators each responsive to light gated by a separate one of said first and second shutters for generating said control signals, and d. a pair of counting circuits each for counting the control signals generated by a separate one of said generators.

16. Apparatus as defined in claim 14 wherein said control means includes a. a pair of coincidence detector circuits, and b. a pair of pawl and ratchet mechanisms each responsive to coincidence detection by a separate one of said coincidence detector circuits for terminating operation of said drive means.

17. Apparatus as defined in claim 14 wherein said coupling means includes a. a pair of idler drums mounted for rotation about a common axis parallel to said Y axis for driving engagement with said motor, b. a friction wheel fixed on the axis of said pinion in driving engagement with one of said idler drums, c. a shaft mounted for rotation about an axis spaced from and parallel to the common axis of rotation of said idler drums, d. a belt and pulley mechanism connecting the other of said idler drums and said shaft, and e. a cord and pulley mechanism connecting said shaft and said gear rack.

18. Apparatus for use with an object having a plurality of areas within a two-dimensional coordinate system and identified by corresponding addresses along the respective dimensions comprising:

a. means for providing area preselection signals representative of the address of a preselected one of said areas, b. a fixed work station, c. positioning means effective when actuated for moving said object relative to said work station in the directions of said dimensions to any one of a plurality of positions in each of which a separate one of said areas is positioned at said work station, d. said positioning means including i. a pinion mounted with its axis extending in the direction of one of said dimensions for rotation about its axis, and ii. a gear rack connected to said object and mounted with its axis extending in the direction of the other of said dimensions in meshing engagement with said pinion and for sliding movement axially of said pinion, e. drive means effective when operated to actuate said positioning means for moving said object away from one of said positions towards another of said positions which is predetermined by the address of said preselected area, f. said drive means including i. a single electric motor, and ii. coupling means for releasable engagement with said motor for coupling said motor to said positioning means, said coupling means being operable when in engagement with said motor to rotate said pinion about its axis and to slide said gear rack axially of said pinion in directions to move said object away from said one position, iii. said coupling means including A. a pair of idler drums mounted for rotation about a common axis parallel to said other of said dimensions for driving engagement with said motor, B. a wheel fixed on the axis of said pinion in driving engagement with one of said idler drums, C. a shaft mounted for rotation about an axis spaced from and parallel to the common axis of rotation of said idler drums, D. a belt and pulley mechanism connecting the other of said idler drums and said shaft, and E. a cord and pulley mechanism connecting said shaft and said gear rack, g. means for effecting engagement between said motor and said coupling means and initiating operation of said drive means, and h. control means for automatically terminating movement of said object upon its arrival at said another position to thereby position said preselected area at said work station.

* * * * *